United States Patent [19]

Fish

[11] 4,200,126
[45] Apr. 29, 1980

[54] PLASTIC COMPOSITE TUBULAR ELEMENT CONTAINING A SLEEVE OF BRAIDED METALLIC RIBBONS

[75] Inventor: Elson B. Fish, Lakeville, Ind.

[73] Assignee: Plas/Steel Products, Inc., Walkerton, Ind.

[21] Appl. No.: 931,450

[22] Filed: Aug. 7, 1978

[51] Int. Cl.$^2$ .............................................. F16L 9/16
[52] U.S. Cl. .................................. 138/143; 138/127; 138/133; 174/47; 174/109
[58] Field of Search ............... 138/127, 129, 130, 132, 138/133, 138, 143, 144, 124, 172, 174, 103; 174/109, 47

[56] References Cited

U.S. PATENT DOCUMENTS

| | | | |
|---|---|---|---|
| 359,222 | 3/1887 | Meaconn | 138/127 |
| 957,867 | 5/1910 | Cobb | 174/109 X |
| 1,736,106 | 11/1929 | Williamson | 138/127 |
| 1,741,491 | 12/1929 | Ansell | 138/127 X |
| 1,948,410 | 2/1934 | Williamson | 138/127 |
| 2,829,671 | 4/1958 | Ernst et al. | 138/127 X |
| 2,863,032 | 12/1958 | Morris | 174/109 |
| 3,091,262 | 5/1963 | Donaldson | 138/143 |
| 3,189,054 | 6/1965 | Rucks et al. | 138/143 |
| 3,240,867 | 3/1966 | Maddox | 174/109 X |
| 3,253,619 | 5/1966 | Cook et al. | 138/125 |
| 3,481,368 | 12/1969 | Vansickle | 138/133 X |
| 3,924,632 | 12/1975 | Cook | 138/125 |

FOREIGN PATENT DOCUMENTS

| | | | |
|---|---|---|---|
| 484389 | 5/1938 | United Kingdom | 138/127 |
| 576551 | 4/1946 | United Kingdom | 138/127 |

Primary Examiner—Richard E. Aegerter
Assistant Examiner—James E. Bryant, III.
Attorney, Agent, or Firm—Gust, Irish, Jeffers & Hoffman

[57] ABSTRACT

A rigid plastic composite tube includes a first sleeve of helically braided metallic ribbons, a second sleeve engaged with the first sleeve either on the inside or outside thereof, the second sleeve being of helically braided fibrous strands, said sleeves being embedded in solid plastic material to form a unitary composite tubular structure.

The method of this invention for fabricating such plastic composite tubes comprises the steps of braiding metallic ribbons and fibrous strands about an elongated form, conforming the ribbons to the shape of said form by tensioning the strands during the braiding thereof, impregnating the composite sleeve with liquid hardenable plastic, and then hardening the plastic thereby providing a solidified plastic composite sleeve.

5 Claims, 11 Drawing Figures

U.S. Patent   Apr. 29, 1980   4,200,126
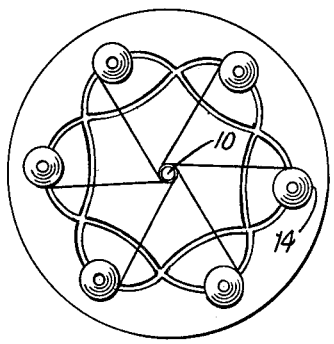
FIG. 4
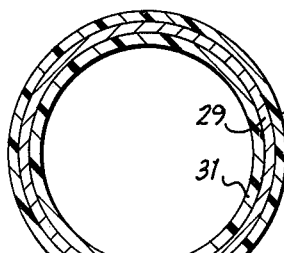
FIG.10
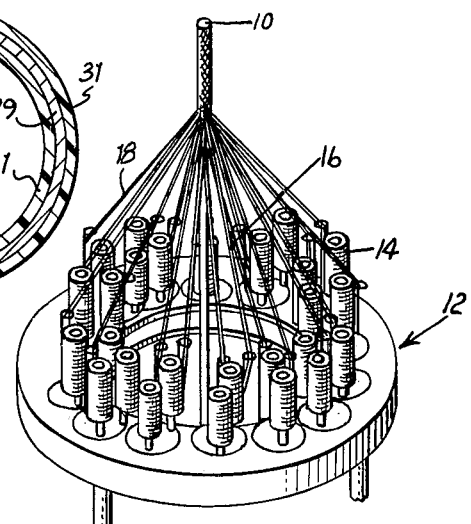
FIG. 3
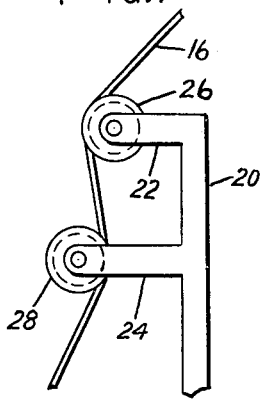
FIG.5
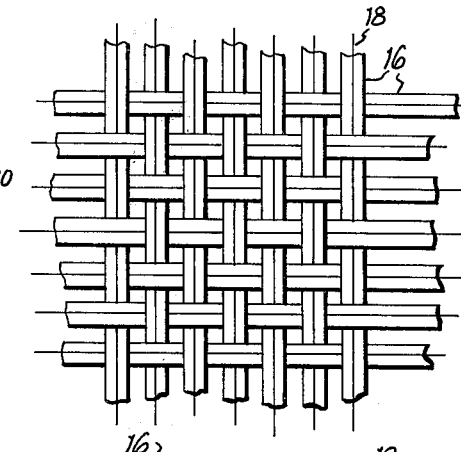
FIG.11
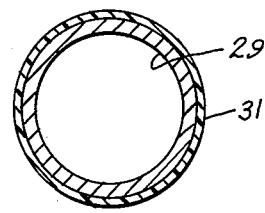
FIG.2
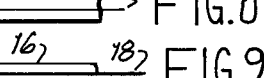
FIG.8
FIG.9
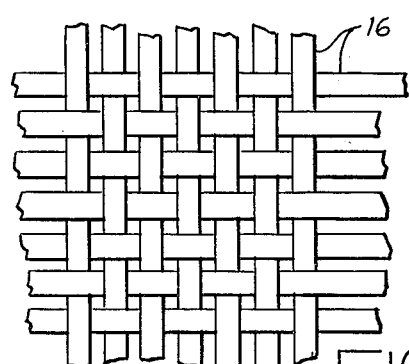
FIG.7
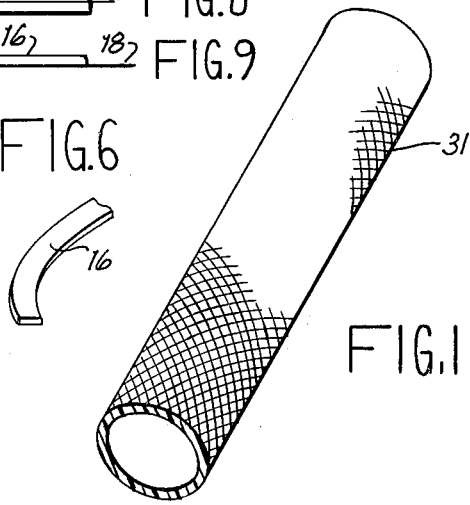
FIG.6
FIG.1

PLASTIC COMPOSITE TUBULAR ELEMENT CONTAINING A SLEEVE OF BRAIDED METALLIC RIBBONS

BACKGROUND OF THE INVENTION

1. Field of the Invention

The present invention relates to plastic composite tubular structures and methods of fabricating the same and more particularly to such structures which include as an element thereof a sleeve braided of metallic ribbons.

2. Description of the Prior Art

Tubular structures have been fabricated by brading metallic ribbons adhered together by the engagement of the ribbons as woven together. Also, elements of various shapes, such as tubular, have been formed by first weaving ribbons of metal into fabric form then forming the fabric to the shape desired and securing it in such shape with adhesives or self-adhesive tape. Metallic foils have been spirally wound over and under spirally wound kraft paper, for example as shown in U.S. Pat. No. 3,687,351. Metallic tapes in combination with laminations of fiber reinforced plastic have also been used in forming tubular structures as disclosed in U.S. Pat. Nos. 3,091,262 and 3,189,054.

SUMMARY OF THE INVENTION

The present invention includes a rigid plastic composite tube containing a sleeve of braided metallic ribbons comprising a first sleeve of helically braided metallic ribbons, a second sleeve engaged with the first sleeve either on the inside or outside thereof or both, the second sleeve being of helically braided fibrous strands, such as glass fiber, and a third sleeve of solid plastic material in which the first and second sleeves are embedded and thereby held in a unitary composite tubular structure.

Instead of the second sleeve being engaged with the inner or outer surface of the first sleeve, the fibrous strands may be braided conjointly with the metallic ribbons in a single sleeve configuration rather than in laminated sleeve arrangement.

The method of this invention for fabricating such a plastic composite sleeve comprises the steps of braiding metallic ribbons and fibrous strands about an elongated form, conforming the ribbons to the shape of the form by tensioning said strands during the braiding thereof, thereby providing a composite sleeve of ribbon and strands on said form which conforms to the shape of the latter, impregnating the composite sleeve with liquid hardenable plastic, and hardening the plastic thereby providing a rigid plastic composite sleeve.

The braiding of the strands may be performed after braiding the metallic ribbons and applied either to the inside or outside of the sleeve of braided ribbons thereby providing a laminated structure.

Alternatively, before braiding, each ribbon is joined with one strand and the two are then braided together into the sleeve form.

Plastic composite tubular structures of the foregoing have strength against deformation by reason of the conjoint ribbon and strand braid configuration in the plastic body, the fiber strands insure retention of the plastic or resin which also holds the braided ribbon sleeve in place, and in practicing the method, the braided metallic ribbon is conformed to the shape of an elongated form or mandrel by plying therewith fibrous strands which may be glass.

It is an object of this invention to provide a plastic composite tubular element wherein a sleeve of braided metallic ribbon is shaped to a desired internal size and shape, and a method of fabricating the same.

It is a further object to provide a hollow magentic shield and method of fabricating the same.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings, FIG. 1 is a perspective view of a plastic composite tube of this invention;

FIG. 2 is a cross section thereof;

FIG. 3 is a perspective view of a brading machine used in the method of fabricating the tube of FIGS. 1 and 2;

FIG. 4 is a top plan view of the table of the braiding mechanism of FIG. 3, but showing a reduced number of spools and track undulations;

FIG. 5 is a fragmentary view of a strand guide or carrier associated with each spool on the braiding mechanism of FIGS. 3 and 4;

FIG. 6 is a perspective view of a short section of metallic ribbon braided into sleeve form to provide a layer in the composite tubular structure of FIGS. 1 and 2;

FIG. 7 is an illustration of the braided weave pattern of the ribbons and strands which form the sleeves in the tubular elements of FIGS. 1 and 2;

FIGS. 8 and 9 are side and edge views, respectively, of a length of ribbon and strand assembled together prior to braiding;

FIG. 10 is a cross-section of an alternative embodiment having a braided sleeve of ribbon sandwiched between two sleeves of braided strand, and FIG. 11 is an illustration like FIG. 7 but with the ribbons and strands interwoven.

DESCRIPTION OF THE PREFERRED EMBODIMENT

Referring to the drawings, the braiding apparatus shown in FIGS. 3 and 4 is conventional and essentially the same as disclosed in U.S. Pat. No. 2,983,182. A mandrel 10, which determines the shape of the hollow portion of the finished tube or rod, is disposed vertically and is movable axially upwardly. In the drawings, this mandrel is illustrated as being circular in cross-section; however, as will appear from the following description, it may have any desired cross-sectional shape depending upon the shape desired in the finished tube or rod.

Surrounding the mandrel is a braiding apparatus indicated generally by the reference numeral 12 in FIG. 3. This apparatus is of conventional design and carries a plurality of spools 14 of strand-like material which revolve with respect to each other and around the mandrel for weaving a braid. The strand-like material used in this invention for fabricating the plastic composite tubing is conventional, including flexible metallic ribbon or strips and fibrous strands which includes monofilaments. In a working embodiment of this invention, there are a total of thirty-two spools in the braiding apparatus 12, sixteen of these containing metallic ribbon 16 and the remaining sixteen fibrous strand 18.

For purposes of explaining this invention, the fibrous strand is glass fiber which preferably is single end of about 1800 yards per pound. As will appear from the description that follows, strands of other fibrous materials and glass fiber of different size may be used without departing from the spirit and scope of the general aspects of this invention; however, for one embodiment of this invention, the aforementioned specifications for the glass fiber strand were found to be particularly advantageous.

The metallic ribbon indicated by the numeral 16 in FIGS. 5 and 6 is flat and flexible to a sufficient extent that it can be braided in flat condition about the mandrel 10. While the material of the ribbon 16 may be of different compositions and alloys, for the working embodiment disclosed, it is an alloy marketed by Allied Chemical Corporation, Metglas Products, 7 Vreeland Road, Florham Park, N.J. 07932, and is termed METGLAS 2826 Alloy, the word Metglas being a trademark of Allied Chemical. Such Metglas Alloy is published as having the following parameters and values as listed:

| Paramater | Value |
| --- | --- |
| Nominal Composition | $Fe_{40}Ni_{40}P_{14}B_6$ |
| Nominal Dimensions | 2 mil × 70 mil |
| Mechanical Properties | |
| Ultimate Tensile Strength | $250 \times 10^3$ psi |
| Tensile Modulus | $18 \times 10^6$ psi |
| Tensile Elongation | 1.4% |
| Hardness, DPH | 750 |
| Tensile Creep 200° C. $200 \times 10^3$ psi | 0.72%/1000 hrs |
| Electrical Properties | |
| Resistivity | 180 micro ohms · cm |
| Temperature Coefficient of Resistance | 145 ppm/°C. |
| Resistance Change %/1000 hrs at 150° C. | 0.3% |
| Magnetic Properties | |
| Permeability, Max. | 65,000 |
| Coercive Force (Toroid Measurement) | 0.06 Oe |
| Saturation Magnetization 4 $M_s$ | 7.8 kgauss |
| $B_r/B_s$ | 0.4 |
| Physical Properties | |
| Density | 7.51 gm/cm$^3$ |
| Thermal Conductivity | 0.118 watts/cm/°C. |
| Maximum Use Temperature | 100° C. |
| Thermal Coefficient of Expansion | $10.5 \times 10^{-6}$/°C. |

The following disclosure pertaining to a working embodiment of this invention shall be considered to use the aforesaid Metglas product which is found to break somewhat easily during braiding and therefore requires gentle handling or other processing which will be explained in more detail hereafter.

Assuming that single end glass fiber strand is carried by sixteen of the spools in the braiding mechanism 12 and the remaining sixteen spools are of the metallic ribbon, in operation, the mandrel 10 is initially moved downwardly to its lowermost position. Metallic ribbon, indicated generally by the reference numeral 16, is paid off the spools 14, and are tied around the mandrel 10 at the upper end by means of a string or cord which secures the ribbon ends to the mandrel.

An important feature resides in the tensioning of not only the glass fiber strands 18 but also the ribbon 16 in the application thereof to the mandrel 10. This is usually accomplished by means of the use of a thread guide as shown in U.S. Pat. No. 3,457,962, this being suitable for tensioning the glass fiber strands; however, the guide for the ribbons 16 takes a slightly different form being shown in FIG. 5 as being formed of an upstanding post 20 having two laterally extending arms 22 and 24 carrying on the distal ends thereof two flanged rollers 26 and 28 which provide a cylindrical groove essentially equal to the width of the ribbon 16. The ribbon 16 extends from the supply spool and is threaded over and under the two rollers 26 and 28 as shown before being attached to the upper end of the mandrel 10. The upright member 20 is secured to the support for the respective spool 14 to move therewith. The rollers are so arranged that as the ribbon 16 is pulled therethrough, it engages the rollers 26 and 28 thereby guiding and tensioning the ribbon as it is drawn upwardly to be braided on the mandrel 10.

For controlling the tension of the ribbon 16 during braiding, it is possible to provide an interference fit between the rollers 26 and 28 and the respective shaft or axles so that rotation thereof is frictionally retarded. Also, it would be possible to use the rollers 26 and 28 as stationary guides, the frictional contact between the ribbon 16 and the roller shaped guides 26 and 26 providing the braiding tension in the ribbon.

With the ribbon 16 so secured to the upper end of the mandrel 10, the braider 12 is started operating so as to apply continuously a sleeve 29 of braided ribbons 16 onto the mandrel, the ribbons being interwoven substantially edge to edge and extending in opposite helical directions around the mandrel 10. The mandrel 10 is at all times serving as a form or support around which the braiding operation is performed.

After the full length of the mandrel 10 has been moved upwardly through the braider 12, the braiding and pulling operations are stopped and the ribbons 16 on the lower end of the mandrel are tied with a cord. The ribbons are then cut off and the mandrel assemblage with the sleeve 29 of braided ribbon thereon lowered to the original position inside the braider 12.

Next, strands 18 of fiberglass from the respective spools 14 are now tied by means of a cord or string to the upper end of the mandrel over the sleeve 29 of braided ribbon. These glass strands 18 are passed through guides and eyelets as shown in FIG. 4. of U.S. Pat. No. 3,457,962 before being tied to the mandrel.

The braider 12 is once again set into operation, the mandrel 10 with the first sleeve 29 of braided ribbon thereon being raised slowly whereupon a second sleeve 31 of braided glass fiber strand is applied to the first sleeve 29 when the mandrel has reached its uppermost position. In this position, the braider is stopped as well as the pulling movement of the mandrel, the strands are cut and tied to the lower end of the mandrel by means of a piece of cord or string.

The mandrel assemblage is immersed into a bath of liquid resin. After impregnation, the resin is cured for bonding the threads securely together into a composite tubular form; following this, the mandrel 10 is removed leaving only the tubular structure (FIGS. 1 and 2) as the finished product, which may be machined to size.

In FIG. 2, the first sleeve of helically braided ribbons is indicated by the lamination 29, the sleeve of strands by the lamination 31 and the sleeve of cured resin by both laminations, the sizes thereof being exagerated for purposes of clarity of illustration.

Preferably, epoxy resin is used as the plastic material. After hardening, if desired, the exterior of the tubular structure may be ground to size using the conventional machines and techniques for doing so. The elongated tubular element may be cut into shorter lengths as desired as shown in FIG. 1, depending upon the use to which the cut segment is to be put.

Important in the finished product formed on a cylindrical mandrel is that the inner surface of the tubular element be of cylindrical shape, conforming to the cylindrical exterior of the mandrel 10. It has been found that braiding the metallic ribbon alone onto the mandrel does not conform the interior of the braided sleeve of the mandrel to the extent desired; thus, some further step must be performed in order to secure this shape conformance.

Conforming the shape of the ribbon sleeve 29 to the mandrel is facilitated by the braiding of the fiberglass strand 18 thereover. Since the glass fiber strands 18 are in tension as they are being braided onto the sleeve 29 of metallic ribbon, a radial compressive force is exerted on the ribbon braid forcing it radially inwardly toward the mandrel 10. After hardening of the liquid resin used to impregnate the composite, the two sleeves 29 and 31 are securely bonded together and the resulting tubular element is given strength and rigidity in holding its shape. The glass fiber strands not only contribute to strength and rigidity but also in the fabrication respect to the compressing or conforming the braided ribbon sleeves to the contour of the mandrel 10.

It may be observed at this point that the mandrel 10 does not necessarily have to be circular in cross-section but may be of different shapes, depending upon design requirements.

An alternative method of fabricating the tubular element involves the winding of one metallic ribbon 16 in conjunction with one glass fiber strand 18 (see FIGS. 8 and 9) onto a respective spool 14. In this instance, every spool 14 would have this ribbon-strand assembly 16, 18 thereon. Each ribbon-strand assembly 16, 18 is passed through the tensioning guides 26 and 28 before being fastened to the end of the mandrel. The braiding operation is then performed in which the metallic ribbon 16 and fiber strand 18 are simultaneously braided onto the rod in an interwoven composite. This composite is then immersed in liquid resin for impregnating the composite, removed therefrom and then caused to harden thereby providing a plastic composite tubular element (FIG. 10) similar to the one previously described. The two embodiments described thus far differ essentially in the fact that in the first embodiment, two sleeves 29 and 31 are separately braided onto the mandrel whereas in the second embodiment only a single braiding operation is used.

In following this second method, the metallic ribbon undergoes a similar radially compressive force by reason of the braid of fiber strand thereby conforming the ribbon essentially to the shape of the mandrel. Since the width of the ribbon 16 is much greater than the width of one of the glass fiber strands, the ribbon, for example, being about 70 mils wide in comparison a strand of only about two or three mils thick, the weave of the braided ribbon provides for metal to metal contact almost continuously throughout the sleeve of ribbon braid. This metal to metal contact providing electrical conductivity is important in connection with using a finished tube for magnetic shielding purposes.

A further alternative in fabricating the composite tube resides in using spools 14 of metallic ribbon alternated with spools of fibrous strand. During the braiding, the ribbon and the strand braid together thereby providing the composite ribbon-strand sleeve.

Still further alternatives reside in using multiple sleeves of braided ribbon, one on top of the other, the sleeve of fibrous braid being on the inside or the outside, or both, of the ribbon sleeve, and still further laminating the fibrous sleeves between ribbon sleeves.

In the braiding of the sleeve of metallic ribbon, small openings appear in the weave. If it is desired to close these openings, a second and even a third sleeve of ribbon is braided over the first, this resulting in the ribbons of the various sleeves overlying the openings in the other sleeve or sleeves.

The use of the fiber strands in the braiding process serves to facilitate the braiding of the metallic ribbon of Metglas. During the braiding process, the Metglas being somewhat brittle breaks rather easily, but when accompanied with the strands of glass fiber, the breakage problem is in some instances entirely eliminated and in others materially reduced.

Further, the braiding of the fibrous strands either onto or in conjunction with the braiding of the metallic ribbons serves to radially compress the latter and to conform them to the shape of the mandrel. This results in forming an interior surface in the ribbon braid which can be held to close tolerance in both size and shape. During the braiding of the glass fiber, the braiding tension serves to compress and to conform the metallic ribbon around the mandrel.

Another important reason for using the glass in combination with the metal is that without the glass, the liquid resin tends to run off the metal which results in a product of non-uniform wall thickness and incomplete impregnation. It has been discovered that with the glass present, the liquid resin is retained in the composite so that when hardened, the composite is essentially embedded in the plastic thereby forming a rigid, self-supporting sleeve having strength against radial distortion as well as flexing. Thus, the glass fiber sleeve not only contributes to strength and rigidity but also to retain the liquid resin in and around the metallic sleeve and furthermore during fabrication applies a force to the metallic ribbons which causes them to form inwardly toward the mandrel, the internal size and shape thereby being determined.

In the description of a working embodiment of this invention, particular materials have been given for the ribbons, strands and plastic. However, strands of other fibrous material such as cotton, graphite or organic fibers may be used in place of the glass fiber. While Metglas has been specified in one working embodiment, it will be obvious that other maleable metals or alloys may be used without departing from the spirit and scope of this invention. For ribbons of minimal tensile strength and are easily broken during braiding, the use of a reinforcing fibrous strand solves or at least reduces the breakage problem thereby facilitating the braiding of such metallic ribbons into sleeve form. The weaving of the reinforcing materials as aforesaid contribute a high degree of strength and rigidity to the composite tube which, among other advantages, preserves the integrity of the metallic ribbons which otherwise may be easily broken.

For one product of this invention, the wall thickness of one braid of glass fiber is about 0.010 to 0.015 inch. As such the strand is not visible to the naked eye, the impregnated layer thereof being transparent.

While there have been described above the principles of this invention in connection with specific apparatus, it is to be clearly understood that this description is made only by way of example and not as a limitation to the scope of the invention.

What is claimed is:

1. A rigid plastic composite tube comprising a first sleeve of helically braided metallic ribbons in which ribbons extend in helically opposite directions in woven relationship under and over each other in metal-to-metal contact, a second sleeve engaged with said first sleeve, said second sleeve being of helically braided fibrous strands in which strands extend in helically opposite directions in woven relationship, and hardened resin material in which said first and second sleeves are embedded and held in a unitary composite rigid tubular structure; said first and second sleeves in combination retaining said resin in said first sleeve, said second sleeve and said resin reinforcing said first sleeve, whereby said first sleeve is retained in its tubular shape as a part of the composite structure.

2. The composite tube of claim 1 wherein said metallic ribbon is electrically and magnetically conductive, whereby said composite tubular structure may be used as a magnetic shield.

3. The tube of claim 1 wherein each ribbon has at least one strand associated therewith to form a ribbon-strand assembly, said one strand contributing tensile strength to said assembly, there being a plurality of said assemblies braided together to form said two sleeves into a composite single sleeve.

4. The tube of claim 3 wherein said ribbons are Metglas Alloy, said strands are of single end glass fiber, said plastic material is epoxy resin, and said resin impregnating the composite of said strands and ribbons.

5. The tube of claim 1 including another sleeve-like second sleeve, said first sleeve being laminated between said other and said second sleeve.

* * * * *